(12) United States Patent
Routkevitch et al.

(10) Patent No.: US 8,939,293 B2
(45) Date of Patent: Jan. 27, 2015

(54) COMPOSITE MEMBRANE WITH INTEGRAL RIM

(75) Inventors: Dmitri Routkevitch, Longmont, CO (US); Oleg G. Polyakov, Fort Collins, CO (US)

(73) Assignee: Synkera Technologies, Inc., Longmont, CO (US)

( * ) Notice: Subject to any disclaimer, the term of this patent is extended or adjusted under 35 U.S.C. 154(b) by 0 days.

(21) Appl. No.: 13/408,744

(22) Filed: Feb. 29, 2012

(65) Prior Publication Data

US 2013/0005561 A1 Jan. 3, 2013

Related U.S. Application Data

(63) Continuation of application No. 11/745,449, filed on May 7, 2007, now Pat. No. 8,210,360.

(60) Provisional application No. 60/767,513, filed on May 7, 2006.

(51) Int. Cl.
| | | |
|---|---|---|
| *B01D 29/01* | (2006.01) | |
| *B01D 39/14* | (2006.01) | |
| *B01D 67/00* | (2006.01) | |
| *B01D 53/22* | (2006.01) | |
| *C01B 3/12* | (2006.01) | |
| *C01B 3/32* | (2006.01) | |

(52) U.S. Cl.
CPC .......... *B01D 67/0062* (2013.01); *B01D 53/228* (2013.01); *C01B 3/12* (2013.01); *C01B 3/323* (2013.01); *B01D 2325/021* (2013.01); *B01D 2325/06* (2013.01); *C01B 2203/0233* (2013.01); *C01B 2203/041* (2013.01); *C01B 2203/1223* (2013.01)
USPC ................. 210/490; 210/500.25; 210/500.22

(58) Field of Classification Search
None
See application file for complete search history.

(56) References Cited

U.S. PATENT DOCUMENTS

| | | | | |
|---|---|---|---|---|
| 3,525,646 | A | * | 8/1970 | Tannenberger et al. ...... 429/454 |
| 4,472,533 | A | | 9/1984 | Moskovits |
| 5,174,883 | A | | 12/1992 | Martin et al. |
| 5,198,112 | A | | 3/1993 | Martin et al. |
| 5,202,290 | A | | 4/1993 | Moskovits |
| 5,581,091 | A | | 12/1996 | Moskovits et al. |
| 5,734,092 | A | * | 3/1998 | Wang et al. ................... 73/23.25 |

(Continued)

OTHER PUBLICATIONS

Furneaux et al., "The Formation of Controlled-Porosity Membranes From Anodically Oxidized Aluminum" Nature, vol. 337, No. 12, pp. 147-149 ( Jan. 1989).

(Continued)

*Primary Examiner* — Benjamin Kurtz
(74) *Attorney, Agent, or Firm* — Marsh Fischmann & Breyfogle LLP

(57) ABSTRACT

Composite membranes that are adapted for separation, purification, filtration, analysis, reaction and sensing. The composite membranes can include a porous support structure having elongate pore channels extending through the support structure. The composite membrane also includes an active layer comprising an active layer material, where the active layer material is completely disposed within the pore channels between the surfaces of the support structure. The active layer is intimately integrated within the support structure, thus enabling great robustness, reliability, resistance to mechanical stress and thermal cycling, and high selectivity. Methods for the fabrication of composite membranes are also provided.

13 Claims, 9 Drawing Sheets

(56) References Cited

U.S. PATENT DOCUMENTS

| | | | |
|---|---|---|---|
| 5,782,959 A * | 7/1998 | Yang et al. | 96/11 |
| 6,083,297 A * | 7/2000 | Valus et al. | 95/44 |
| 6,705,152 B2 | 3/2004 | Routkevitch et al. | |
| 6,946,197 B2 | 9/2005 | Yadav et al. | |
| 7,393,392 B2 | 7/2008 | Yamaguchi et al. | |
| 7,604,690 B2 * | 10/2009 | Smirnov et al. | 96/11 |
| 2005/0065028 A1 | 3/2005 | Pellin et al. | |
| 2005/0188845 A1 * | 9/2005 | Yamaguchi et al. | 96/11 |
| 2006/0141486 A1 | 6/2006 | Coonan et al. | |

OTHER PUBLICATIONS

Huang et al., "Permeation of Hydrogen Through Palladium/Alumina Composite Membranes" Separation Science and Technology, 36(2), pp. 199-222 (2001).

Itoh et al., "Deposition of Palladium Inside Straight Mesopores of Anodic Alumina Tube and Its Hydrogen Permeability" Microporous and Mesoporous Materials, vol. 39, pp. 103-111 (2000).

Itoh et al., "Preparation of a Tubular Anodic Aluminum Oxide Membrane" Journal of Membrane Science, 117, pp. 189-196 (1996).

Karnik et al., "Towards a Palladium Micro-Membrane for the Water Gas Shift Reaction: Microfabrication Approach and Hydrogen Purification Results" Journal of Microelectromechanical Systems, vol. 12, No. 1, pp. 93-100 (Feb. 2003).

Konno et al., "A Composite Palladium and Porous Aluminum Oxide Membrane for Hydrogen Gas Separation" Journal of Membrane Science, 37, pp. 193-197 (1988).

Ma et al., "Thin Composite Palladium and Palladium/Alloy Membranes for Hydrogen Separation" Ann. N. Y. Acad. Sci. 984: pp. 346-360 (2003).

Park et al., "Gas-Tight Alumina Films on Nanoporous Substrates Through Oxidation of Sputtered Metal Films" Thin Solid Films 476, pp. 168-173 (2005).

Mardilovich et al., "Gas Permeability of Anodized Alumina Membranes With a Palladium—Ruthenium Alloy Layer" Zhurnal Fixicheskoi Khimii 70 (3), pp. 555-558 (1996).

Toh et al., "Fabrication of Free-Standing Nanoscale Alumina Membranes With Controllable Pore Aspect Ratios" 2004 American Chemical Society; Nano Letters; 2004 vol. 4, No. 5; 767-770.

Rajeshwar et al. "Semiconductor-Based Composite Materials: Preparation, Properties, and Performance" Chem. Mater. 2001. vol. 13. pp. 2765-2782. Department of Chemistry and Biochemistry. The University of Texas at Arlington. Arlington, Texas (Jul. 2001).

* cited by examiner

COMPOSITE MEMBRANE WITH INTEGRAL RIM

CROSS-REFERENCE TO RELATED APPLICATIONS

This application claims priority as a continuation application of U.S. patent application Ser. No. 11/745,449 filed May 7, 2007, which claims priority to U.S. Provisional Patent Application No. 60/767,513 filed May 7, 2006. Each of these applications is incorporated herein by reference in its entirety.

STATEMENT REGARDING FEDERALLY-FUNDED RESEARCH

This invention was funded by the National Science Foundation under Grant No. DMI-0420147 (Phase I) and Grant No. OII-0548757 (Phase II), and by the Department of Energy under Grant No. DE-FG02-04ER84086, both administered by the Small Business Innovation Research (SBIR) program. The Government has certain rights in this invention.

BACKGROUND OF THE INVENTION

1. Field of the Invention

The present invention relates to composite membranes, methods for making composite membranes and applications of the composite membranes. The composite membranes include a porous support structure and one or more active layers disposed within the pores of the support structure.

2. Description of Related Art

Efficient and cost-effective membranes are needed in many applications, including separation and purification of gases, such as the purification of hydrogen ($H_2$) for use in fuel cells and in point-of-use applications. As an example, it is often necessary to remove contaminant gases such as carbon monoxide (CO) from a gas stream containing $H_2$. Some membranes include a membrane support and an active layer, where the active layer is permeable to only species that are desired to go through the membrane, commonly referred to as supported membranes. In other cases, the entire membrane body serves as a separating layer, commonly referred to as bulk membranes.

For $H_2$ separation, membrane active layers of metals and metal alloys, particularly those including palladium (Pd), are impervious to all gas species except $H_2$ and thereby separate the $H_2$ from the other gases. Such membranes can be fabricated in the form of self-supporting bulk foils. Although Pd-based bulk foils exhibit near-infinite selectivity for $H_2$, they are expensive and have poor flux due to the required foil thickness.

Active membrane layers can also be supported by porous substrates and thin Pd-based supported films can be used to increase membrane flux. However, the fabrication of thin-film Pd supported membranes that have the required defect-free structure requires a Pd thickness of at least 10 µm to 50 µm, which is too thick for many applications, such as $H_2$ separation in portable fuel cell reformers. Furthermore, the reliability of supported membranes is limited by the poor mechanical integrity of the thin metal layers deposited onto the porous support. Further, the poor mechanical integrity is often exacerbated by temperature cycling and/or mechanical loads that are encountered in use. Also, the reliable sealing of thin supported membranes is also challenging and the cost of the manufacturing and integration of such membranes has hindered their widespread application.

Recently, MEMS technology has been applied to supported membranes to generate defect-free high permeability membranes, as is reported by Karnik et al. ("Towards a palladium micro-membrane for the water gas shift reaction: microfabrication approach and hydrogen purification results", Journal of Microelectromechanical Systems, February 2003, Vol. 12, Issue 1, pgs. 93-100). Submicron-thick Pd "windows" produced on etched silicon wafers demonstrated large hydrogen flux as a function of Pd area and demonstrated high selectivity. However, the total area of the supported Pd membrane was small, limiting the total flux. Additionally, the Pd windows ruptured when subjected to transmembrane pressures of about 0.5 bar, and the thermal reliability of the thin Pd film on Si was a problem due to the mismatch of temperature expansion coefficients.

Although thin-film supported membranes, such those described above for $H_2$ separation, have been fabricated, their commercial utility has not been realized. Such membranes have problems related to poor adhesion of the Pd layer to the support, damage to the Pd layer caused by thermal cycling and susceptibility to damage from mechanical abrasion Films of Anodic aluminum oxide (AAO) includes elongate mesopores that extend through the entire thickness (Furneau et al, Nature, 71, p. 337 (1992)), and has been utilized as a substrate for different types of membranes. For example, Pd films as thin as 200 nm have been sputtered onto the surface of AAO for a $H_2$ separation membrane, as is reported by Konno et al. ("A Composite Palladium and Porous Aluminum Oxide Membrane for Hydrogen Gas Separation", J. Membr. Sci., Vol. 37, pp. 193-197, 1988) and Mardilovich et al. ("Gas Permeability of Anodized Alumina Membranes with a Palladium-Ruthenium Alloy Layer", Russian J. Phys. Chem., Vol. 70, pp. 514-517, 1996). The resulting membranes exhibit high selectivity and permeability for $H_2$. However, although these membranes could provide much thinner active layer, the active layer is still on the membrane surface and is prone to hydrogen embrittlement and mechanical damage.

Itoh et al. ("Deposition of Palladium Inside Straight Mesopores of Anodic Alumina Tube and its Hydrogen Permeability", Micropor. and Mesopor. Mat. and Chem. Res., Vol. 39, pp. 103-111, 2000) report that Pd was deposited inside the pores of AAO for the fabrication of membranes for the separation of $H_2$. Fabrication of these membranes involved sputtering of a conductive contact from Pd, Pt or Ag onto one of the surfaces of the blank AAO membrane, followed by the electrodeposition of Pd, resulting in an active layer comprised of the Pd deposited onto the contact film on the membrane surface as well as inside the AAO pores. The method does not allow the formation of the active layer disposed entirely within the nanoporous support structure.

SUMMARY OF THE INVENTION

In view of the foregoing, it is a primary objective of the present invention to provide a composite membrane, where the composite membrane has improved resistance to thermal cycling. A further objective is to provide a composite membrane having improved mechanical reliability. It is a further objective to provide a composite membrane having improved adhesion of the active layer to the support structure. It is another objective of the present invention to provide a composite membrane having a high permselectivity for a gas species of interest, such as $H_2$. It is another objective of the present invention to provide a composite membrane that is attached to a metal rim for low cost and convenient sealing and integration of membranes into membrane modules and separating systems.

One or more of the foregoing objectives and advantages may be realized according to the present invention, which in one aspect provides a composite membrane comprising a porous support structure and one or more active layers disposed within the pores of the support structure. According to this aspect, the thin active layer can facilitate high permeance of a gas species even as the support structure can be of much greater thickness to provide required mechanical integrity over a wide pressure range.

A composite membrane according to the present invention can include a porous support structure having a first major surface and a mutually opposed second major surface, the porous support structure having substantially parallel elongate pore channels extending through the support structure from the first major surface to the second major surface. The membrane includes an active layer comprising an active layer material, the active layer material being completely disposed within the elongate pore channels between the first major surface and the second major surface.

According to one aspect, the porous support structure comprises anodic aluminum oxide. According to a further aspect, the active layer is spaced inwardly from each of the first and second major surfaces, such as by at least about 1 nm.

According to one aspect, the composite membrane is a symmetric pore membrane, wherein the pore channels have a substantially constant diameter throughout their length. The pore channels can have an average pore diameter, for example, of at least about 1 nm and not greater than about 1000 nm. The porous support structure can have an average thickness of, for example, at least about 0.1 μm and not greater than about 500 μm. The active layer can have an average thickness of, for example, not greater than about 5 μm and at least about 1 nm.

According to one aspect, the composite membrane is an asymmetric pore membrane, wherein the pore channels comprise portions of varying total porosity and/or average pore size. For example, the pore channels can include at least a first portion having a first average pore diameter and a second portion having a second average pore diameter, wherein the first average pore diameter is at least about 1 nm and not greater than about 1000 nm and the second average pore diameter is smaller than the first average pore diameter. For example, the second average pore diameter can be not greater than about 100 nm, such as not greater than about 50 nm. Further, the second average pore diameter can be at least about 0.1 nm. According to one aspect, the active layer has a thickness of at least about 1 nm and not greater than about 5 μm. The active layer can be disposed within the second portion of the pore channels, and can comprise dense nanoplugs of the active layer material, such as Pd or alloys of Pd.

According to yet another aspect, the active layer comprises a first active layer material and a second active layer material that is different than said first active layer material, such as where the first active layer material is adapted to separate a gas species and the second active layer material is a catalytic material. According to another aspect, the composite membrane can include an aluminum rim disposed around and adhered to an outer edge of the support structure, such as to facilitate sealing of the membrane within a device.

According to one aspect, the active layer or layers disposed within the support structure can have the same or different pore size and porosity and the same or different composition as the support structure. The active layer can comprise coatings of the active material in the form of nanoplugs, nanotubes or nanoparticles disposed inside the pores of the support structure.

According to another aspect, the total porosity of the support structure is well-controlled to be in a range of at least about 5% and not greater than about 90%.

The use of anodic aluminum oxide can enable the active layer to have a thickness in the range of from below about 1 nm to tens of micrometers.

For composite membranes useful for $H_2$ separation, the thickness of the active layer of metal or metal alloy can be as thin as 10 nm, enabling an increase in $H_2$ flux by orders of magnitude as compared to conventional foil membranes or thin film supported membranes, while maintaining high permselectivity for $H_2$.

According to one aspect of the present invention, the small size of the nanostructures of active layer materials embedded within the pores also greatly increases their resistance to thermal cycling and/or mechanical loads, reducing defect formation. Nanostructured materials in general have greater mechanical strength and greater integrity during thermal cycling as compared to microstructured composite membranes.

According to one aspect of the present invention, the location of the active layer within the pores of the support structure can be controlled such that the active layer is disposed at a predetermined position beneath the surface of the support structure. This can be achieved, for example, through the use of sacrificial layer(s) during manufacture of the composite membrane. Placement of the active layer within the thickness of the support structure, as compared to placement on the membrane surface, enables a composite membrane having increased performance and increased reliability. Advantages can include increased adhesion of the active layer to the support structure, and increased resistance to thermal cycling and mechanical abrasion damage.

According to one aspect of the present invention, the active layer is comprised of several different materials disposed in multiple layers that can be deposited either consecutively or concurrently. The material layers can be oriented either perpendicular or parallel to the pore axis to achieve desired separation performance.

According to another aspect, the composite membranes of the present invention can be fabricated into virtually any shape, including either planar or tubular formats.

One embodiment of the present invention is directed to a method for fabricating a composite membrane. The method can include the steps of providing a porous support structure having a first major surface and a mutually opposed second major surface, the porous support structure comprising elongate pore channels extending through the support structure from the first major surface to the second major surface, providing a sacrificial layer that is at least partially disposed on the first major surface of the porous support structure, depositing an active layer material within the pore channels and adjacent to the sacrificial layer, and removing the sacrificial layer from the first major surface of the porous support structure. The active layer material can advantageously form an active layer that is completely disposed within the elongate pore channels between the first major surface and the second major surface.

According to one aspect, the porous support comprises anodic aluminum oxide. Accordingly, the step of providing a porous support structure can include providing an aluminum metal substrate having at least one top surface, masking a portion of the top surface to define a target area, placing the aluminum substrate in an electrolyte, and anodizing the aluminum metal to form anodic aluminum oxide by applying a voltage to the aluminum metal. The masking step can include the use of photolithography. According to this aspect, the aluminum metal substrate can function as the sacrificial layer, and the step of removing the sacrificial layer can include masking at least a portion of the aluminum metal substrate to form a masked portion, wherein the masked portion is not removed during the removal of the sacrificial layer. In one aspect, the masked portion is disposed around a peripheral edge of the porous support structure.

According to another aspect of this method, the step of providing a sacrificial layer can include depositing a sacrificial material on at least the first major surface, such as by electrodeposition of the sacrificial material. Further, the sacrificial material can be deposited at least partially within the pore channels, such that the formed active layer is spaced inwardly from the first major surface. The sacrificial material can comprise, for example, Cu and the active layer material can comprise Pd, including Pd alloyed with a metal selected from the group consisting of Cu and Ag. The active layer material can also be deposited by electrodeposition. A second active layer material can also be deposited within the pore channels.

According to another aspect of this method, a solvent can be added to the electrolyte to lower the freezing point of the electrolyte, such that the anodization can be carried out at a reduced temperature. For example, the solvent can be selected from the group consisting of alcohols, ketones and glycols. In another aspect, a material can be added to the electrolyte to increase the anodization voltage of the electrolyte, such that the anodization can be carried out at increased voltages.

One embodiment of the present invention is directed to an asymmetric porous anodic aluminum oxide structure. The structure can include a first major surface, a mutually opposed second major surface, and a plurality of substantially parallel elongate pore channels extending through the support structure from the first major surface to the second major surface, the pore channels comprising at least a first portion having a first average pore diameter, a second portion having a second average pore diameter, and a third portion disposed between the first and second portions, the third portion having a third average pore diameter, where the third average pore diameter is different than either of the first and second average pore diameters.

According to one aspect of this embodiment, the first and second average pore diameters are substantially the same. According to another aspect, the first average pore diameter is greater than the second average pore diameter. At least one of the first, second and third average pore diameters can be at least about 1 nm and is not greater than about 1000 nm. Further, an active layer can be disposed within one of the portions, such as the third portion, such as to form a composite membrane.

A further embodiment of the present invention is directed to a method for the fabrication of an asymmetric anodic aluminum oxide structure. The method can include the steps of providing an aluminum metal substrate, placing the aluminum metal substrate in an electrolyte and anodizing the aluminum metal substrate to form anodic aluminum oxide by applying a voltage to the aluminum metal, wherein the anodizing step includes changing the voltage during at least a portion of applying the voltage at an absolute rate of not greater than about 100V/s (i.e, a rate that is from +100 V/s to −100V/s).

According to one aspect of this method, the rate of voltage change (dE/dt) varies during at least a portion of the anodizing step. For example, an initial rate of voltage change $(dE/dt)_1$ can be at least about −0.1 V/min and not greater than about −10 V/s. According to a further aspect, a final rate of voltage change $(dE/dt)_2$ is different than the initial rate of voltage change and is at least about −10 V/min and is not greater than 0.

The foregoing method can be used to fabricate an asymmetric structure having a plurality of substantially parallel elongate pore channels extending through the support structure from a first major surface to a second major surface, the pore channels comprising at least a first portion having a first average pore diameter, a second portion having a second average pore diameter, and a third portion disposed between the first and second portions, the third portion having a third average pore diameter, where the third average pore diameter is different than either of the first and second average pore diameters.

According to yet another embodiment, the present invention is directed to an anodic aluminum oxide structure where the structure comprises a porous anodic aluminum oxide substrate having a first major surface and a mutually opposed second major surface and pore channels disposed through the substrate and extending from the first major surface to the second major surface, an edge connecting the first and second major surfaces around a periphery of the substrate, and an aluminum metal rim disposed around the peripheral edge of the substrate, the peripheral edge being directly bonded to the substrate.

DESCRIPTION OF THE INVENTION

Figure 1:
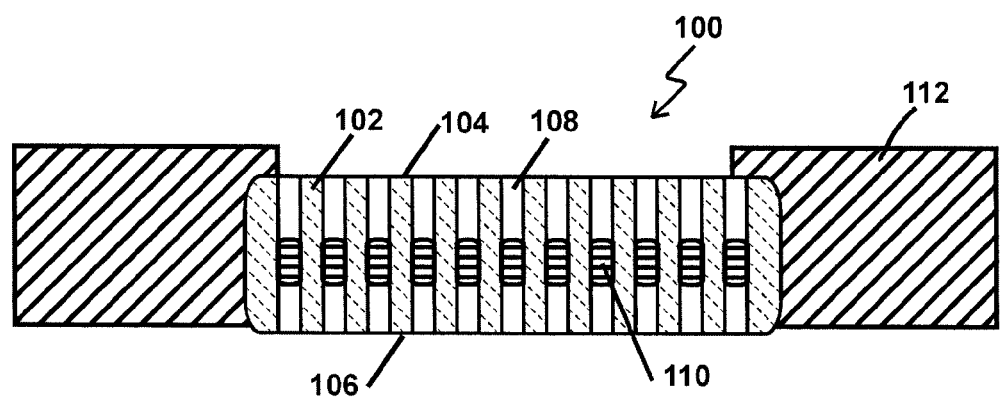
FIG. 1 illustrates a schematic representation of the structure of a composite membrane according to an embodiment of the present invention.

The present invention is directed to a composite membrane, such as for the selective separation of gas species. The composite membrane 100, shown in FIG. 1, includes a porous support membrane (or support structure) 102 and one or more active layers 110 disposed within the pore channels 108, which extend through the support structure between the first major surface 104 and the second major surface 106 of the support structure 102. The active layer 110 can advantageously be permselective for one or more gas species, such as $H_2$.

In one embodiment, the porous support structure 102 is an anodic aluminum oxide (AAO) substrate. AAO advantageously has substantially parallel and uniform pore channels 108 extending through the thickness of the AAO substrate that are essentially the same diameter along the pore length, including at the location of the active layer. The pore diameter of the pore channels can be at least about 1 nm, such as at least about 5 nm, and can range up to about 1000 nm, such as not greater than about 300 nm. Such support structures where the pores have a substantially uniform diameter through the thickness of the support are referred to herein as symmetric pore membranes 100 shown in FIG. 2.

The thickness of the support structure 102 can be at least about 0.1 µm, such as at least about 10 µm, and can range up to about 500 µm, such as up to about 200 µm. In one embodiment, the composite membrane is a free-standing membrane and the support structure thickness is from about 10 µm to about 500 µm. In another embodiment, the composite membrane is a membrane with Al rim 112, such as one that is attached to a peripheral edge of the support 102, as is illustrated in FIG. 1, and is further illustrated in FIG. 5. The thickness of the supported structure can be at least about 0.1 µm and not greater than about 200 µm.

Figure 2:
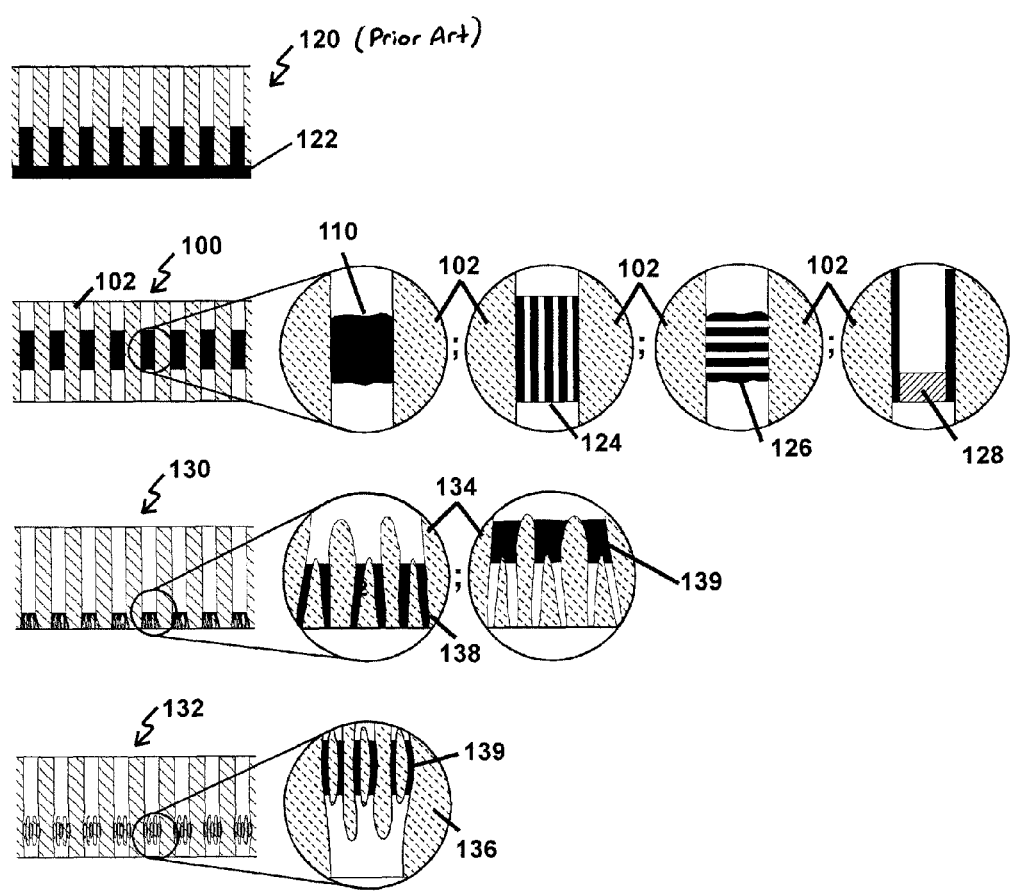
FIG. 2 is a schematic representation of composite membrane according to the prior art (top image) and various embodiments of the present invention.

In another embodiment of the present invention, the composite membrane is an asymmetric pore membrane 130 as shown in FIG. 2. According to this embodiment, throughout most of the porous support thickness the support comprises relatively large pores and a high porosity to maximize overall flux. Accordingly, in one embodiment at least about 50% of the total thickness and not greater than about 99.99% of the total thickness of the support comprise pores having a relatively large first average pore diameter. The total thickness can be at least about 1 µm and not greater than about 500 µm, and the first pore diameter can be at least about 10 nm, preferably at least about 50 nm, and not greater than about 500 nm, preferably not greater than about 300 nm. The porosity of the regions having the first pore diameter is preferably at least about 10%, more preferably at least about 20%, and preferably not greater than about 80%.

In the asymmetric pore membranes, the pores extending through the support structure have a second pore diameter that is less than the first pore diameter. In this regard, this layer 134 (FIG. 2) has pores diameter preferably not greater than about 100 nm and more preferably not greater than about 50 nm. However, for most applications the second pore diameter should be at least about 1 nm.

The active layer according to the present invention comprises materials that have the desired permeation and/or separation properties defined by their composition, structure, morphology or all of the above, as illustrated in FIG. 2. The materials are disposed within the pores of membrane support structure in a variety of architectures, depending on specific embodiments, and can take form of dense nanoscale plugs closing the pores (e.g., nanoplugs 110), conformal nanoscale coatings on the pore walls (e.g., nanotubes), different coatings serving different functions and disposed in parallel relation relative to the pore axis (nanoplug 124) or perpendicular to the pore axis (nanoplug 126). An assembly of separate nanoparticles or other types of nanostructures can also be utilized. These nanoscale structures disposed within the pores and between the surfaces of membrane support at a pre-defined location comprise the active layer. According to one aspect of the present invention, the composite membranes are different from the prior art membranes 120 shown in FIG. 2, where active layer 122 is disposed partly or completely on the surface of the AAO support membrane.

Preferably, the active layer 139 is at least partially disposed within the region of the support having the smaller second pore diameter 134 or 136. This advantageously enables the active layer to have a thickness that is only a fraction of the support structure thickness. In one embodiment, the active layer in an asymmetric pore membrane has a thickness that is not greater than about 50 µm, preferably not greater than about 25 µm and even more preferably not greater than about 1 µm. For most applications, the thickness of the active layer is preferably at least about 0.001 µm. The smaller pore diameter with the active layer disposed therein enables reliable encapsulation of the nanoplugs, nanotubes or nanoparticles of reduced size, in turn enabling thin (as low as about 1 µm, and preferably 0.001 µm) yet defect-free active layer, further increasing permeability, while maintaining high permselectivity.

According to one embodiment of the present invention, different materials can be utilized for the active layer depending upon the targeted application of the composite membrane. For example, the active layer materials can comprise metals, including metal alloys. Preferred among these are Pd and Pd alloys for $H_2$ separation. Ceramics and metal oxides such as alumina ($Al_2O_3$) or silica ($SiO_2$) can be utilized, particularly for reducing the pore size for size-selective separation. Catalytic materials, such as ZnO/Cu or others can be utilized for catalytic separation and membrane-reactors. Polymers such as polyimides can be utilized for olefin/paraffin separation. Salts can also be utilized in the active layer, such as solid proton electrolytes for $H_2$ separation or oxygen-conducting solid electrolytes. Carbon nanotubes can be utilized for size-selective separation and water filtration.

More specifically, active layer materials that are particularly useful for $H_2$ separation can include Pd and Pd alloys. Among the Pd alloys are alloys with Ag, Cu, Ru, Au, Ni, Fe, Si, Mn, Co, Sn, Pb, Y, Ce, and combinations thereof. Metals and alloys other than Pd, such as Ta and Ru can also be utilized. Metal oxides such as $SiO_2$, zeolites, mixed oxides such as Ba—Ce—Y oxide, polymers and other materials can also be used.

According to one preferred embodiment of the present invention for $H_2$ separation, the active layer comprises Pd or a Pd alloy. The Pd alloy can include Cu, particularly 1 mol. % to 99 mol. % Cu, and preferably 30 mol. % to 50 mol. % Cu. In another embodiment, the Pd alloy can include Ag, such as 1 mol. % to 99 mol. % Ag, and preferably 20 mol. % to 40 mol. % Ag.

Other materials that can be utilized for the active layer include amorphous metal alloys (AMA), also referred to as metal glasses, which have been identified as an alternative to Pd for $H_2$ separation due to their strength, toughness, corrosion resistance, and ability to form thin films. However, due to lower bulk permeability in comparison with pure Pd, these materials must typically be used as ultra-thin layers to achieve the required $H_2$ permeability, while maintaining high film integrity and low defect density to sustain the desired selectivity.

All amorphous metal alloys are thermodynamically metastable. When the temperature is increased, the performance of such membranes deteriorates due to gradual crystallization, which affects their practical applications. It is an advantage that the confinement of amorphous metal alloys to small pores in the composite membranes of the present invention can improve the thermal stability and extend their range of application. For example, the AMA alloys can be selected from Zr—Ni and Ni—B(P). Other amorphous metal alloys include Zr—Ni—Hf, Zr—Ni—B, Zr—Nb—Ni, Ni—Pd—P, Ni—Ru—P, Ti—Fe, Fe—B—Si, Fe—Ni—P—B, (combinations of Y, Ti, Zr and Hf with Fe, Ni, Cu, Rh and Pd), Pd—Si, Pd—Cu—Si, Zr—Pd and others. Amorphous metals and alloys can be produced and deposited by various techniques, including rapid quenching of a melt, thermal evaporation, sputtering, electrodeposition, electroless deposition, ion implantation, mechanical alloying, or by hydrogenating the crystalline alloys.

One differentiating feature of the present invention is that the active layer materials can be deposited as nanoplugs, nanotubes, nanoparticles or other nanostructures within a pre-determined location of the pores of a support membrane, forming a thin yet robust and substantially defect free active layer (FIG. 2). The active layer can have a high permeability, high permselectivity and increased robustness that can not be achieved with conventional supported membranes.

Deposition methods for the active layer can include, but are not limited to, electrochemical deposition, electroless deposition, sol-gel deposition, solution impregnation, melt impregnation, polymerization, chemical vapor deposition, atomic layer deposition, plasma sputtering, thermal evaporation, vacuum deposition, and other methods know to those skilled in the art.

Figure 3:
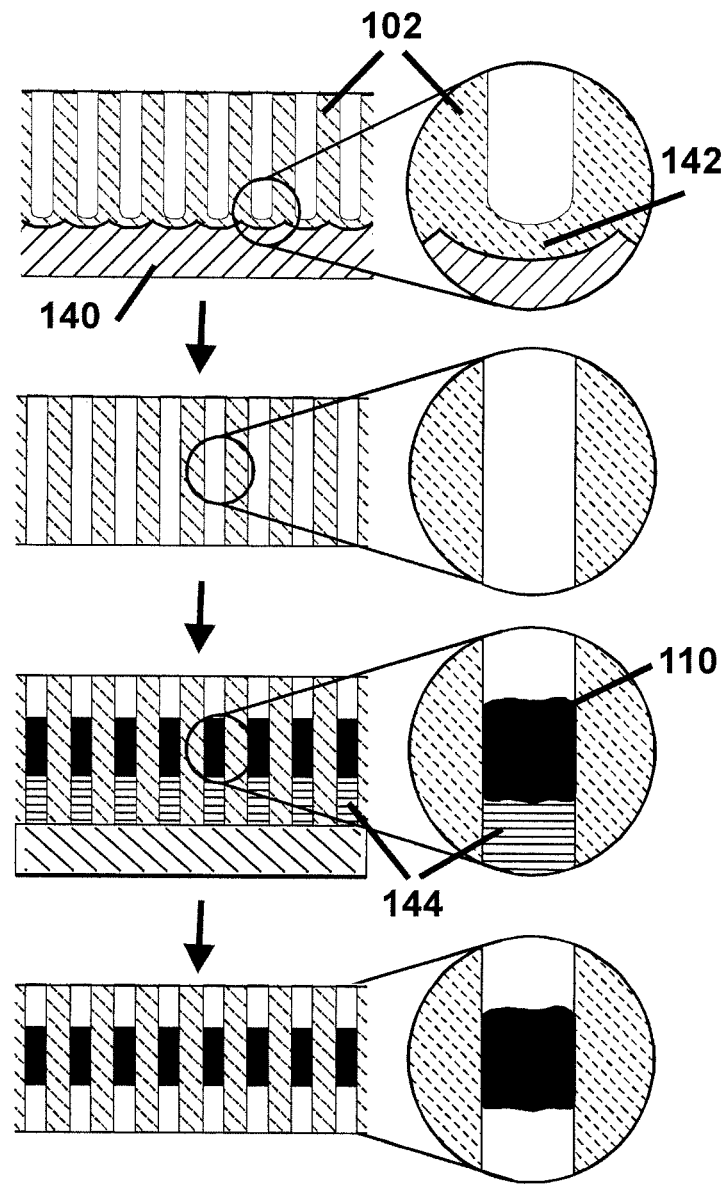
FIG. 3 illustrates a method for the fabrication of a symmetric composite membrane according to an embodiment of the present invention, where an active layer is formed after the separation of the support membrane from Al.
Figure 4:
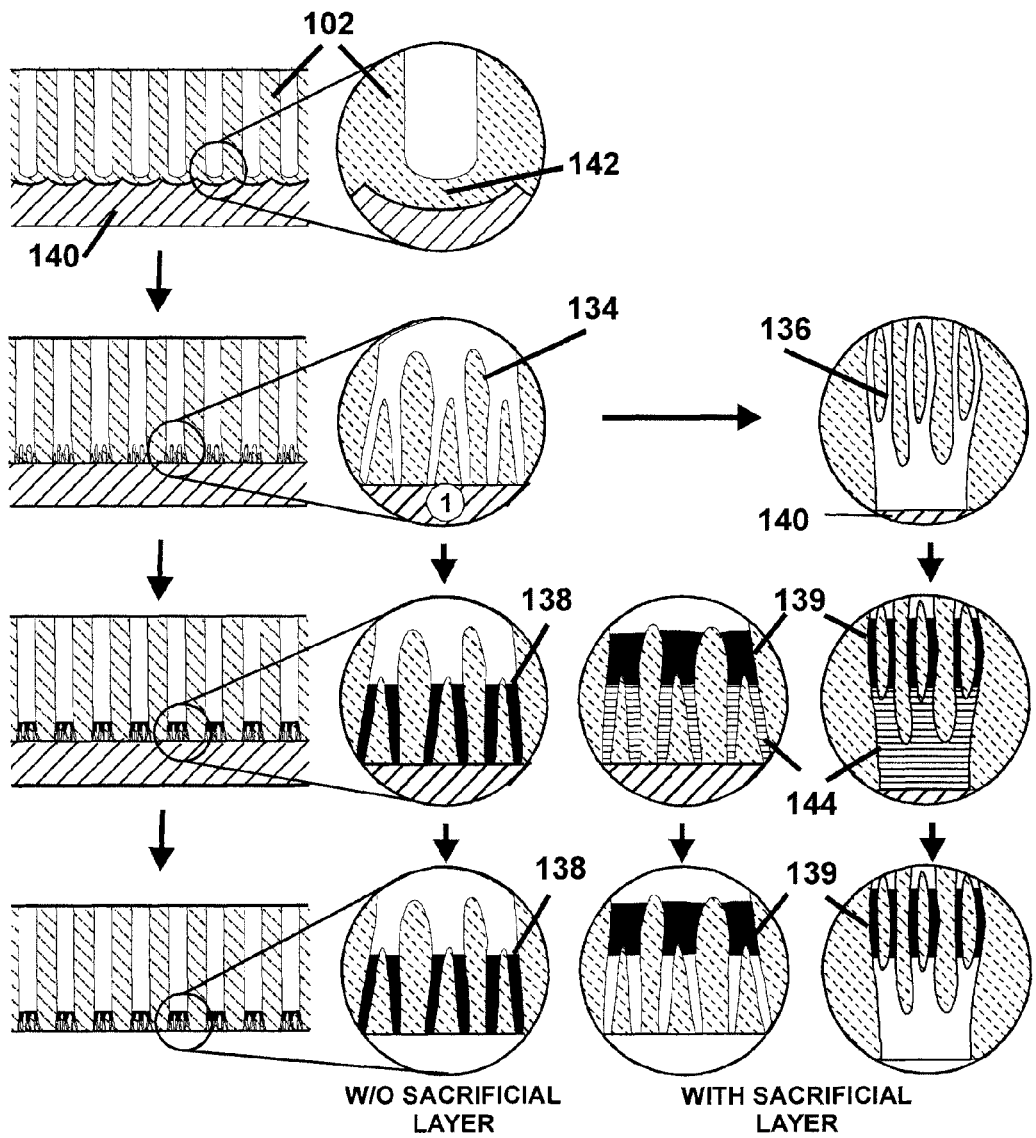
FIG. 4 illustrates a method for the fabrication of an asymmetric composite membrane according to an embodiment of the present invention, where an active layer is formed prior to the separation of the support membrane from Al.

To control the depth of the active layer within the porous support structure, a sacrificial material layer can be used, such as shown in FIG. 3 for symmetric membranes and FIG. 4 for asymmetric membranes. The sacrificial layer 144 can be deposited using any of the methods described above for the active layer. After deposition of the sacrificial layer, the active layer 110 in symmetric membrane (FIG. 3) or 139 asymmetric membranes can then be deposited adjacent to the sacrificial layer, followed by selective removal of the sacrificial layer to leave nanostructures of the active layer at a preselected depth within the pores of the support structure. Materials that can be utilized for the sacrificial layer can include metals, salts, oxides, ceramics, polymers and other materials.

Several materials can be used as a sacrificial layer for a Pd-based active layer. These include metals such as Cu, Zn, Fe, Co, Ni, Ag, In, Sn, Pb, Bi and mixtures thereof, with Cu and Zn being particularly preferred. Metal oxides can also be utilized, particularly $Al_2O_3$, $SiO_2$, $TiO_2$ and ZnO, with ZnO being particularly preferred. Further, polymers, and in particular conducting polymers, can also be used.

As shown in FIG. 3, one group of preferred methods for the fabrication of composite membranes for $H_2$ separation involves separation of the AAO membrane 102 support from its originating Al substrate 140, followed by deposition of conductive contacts and a sacrificial Cu 144 onto the face of the membrane support, followed by electrodeposition of Pd to form the active layer 110 within the pores. Another method shown in FIG. 4 can utilize the Al foil 140 as an electrical contact for electrodeposition of both the sacrificial Cu layer and the Pd active layer.

Figure 5:
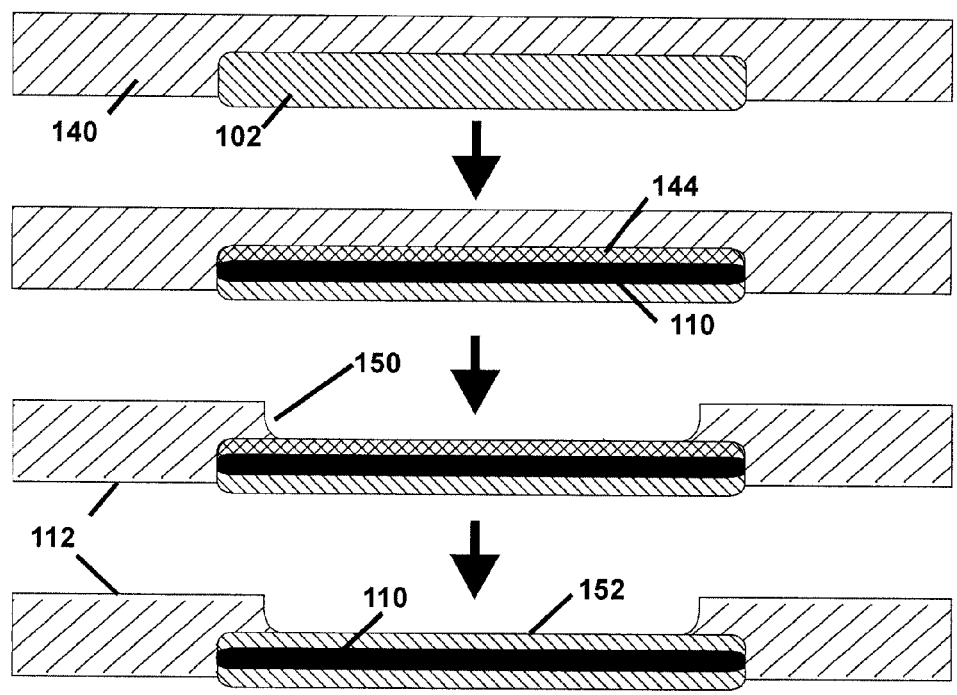
FIG. 5 illustrates a method of the fabrication of planar composite membranes having a metal rim according to an embodiment of the present invention.

According to one embodiment shown in FIG. 5, the fabrication method provides the fabrication of composite membranes with an integrated Al rim 112. Using similar approach, another method provides fabrication of tubular membranes with integrated Al ends.

Support Structure and Method of its Fabrication

The present invention includes the use of a porous support structure. Preferably, the porous support comprises anodic aluminum oxide (AAO) formed by anodization (electrochemical oxidation) of aluminum (Al). A method for the fabrication of AAO is described, for example, in U.S. Pat. No. 6,705,152 by Routkevitch et al., which is incorporated herein by reference in its entirety.

According to the present invention, prior to anodization to form the AAO, the Al foil is cut and rolled to reduce the thickness of the Al foil to a thickness of not greater than about 80% of the original thickness. After reducing the thickness, the Al foil is annealed at a temperature of at least about 200° C. and more preferably at least about 350° C. The annealing is preferably a pressure-anneal, where the pressure during annealing is above atmospheric pressure, such as a pressure of at least about 5,000 psi, and preferably not greater than about 20,000 psi, more preferably not greater than about 10,000 psi.

It has been found that this rolling and pressure-annealing treatment advantageously results in an Al foil having the desired thickness, surface quality and crystalline structure (from non-textured nanocrystalline structure to highly textured structure with large grain size) in order to produce AAO support structures suitable to specific uses.

The resulting Al foil is cleaned and optionally pre-anodized to form an AAO layer, such as an AAO layer having a thickness of from about 1 μm to about 100 μm. The AAO layer is then stripped to remove the defective surface layer and to provide an Al foil surface pre-patterned with pore indents.

The Al foil can then be lithographically patterned or masked on one of both sides, such as by using tape, varnish, compression gaskets, or similar means. The patterning defines the membrane size and shape. The Al foil can then be anodized to form the support structure having the desired thickness and pore diameter.

Anodization of an Al foil to form AAO substrates with pore diameter of from about 20 nm to about 200 nm is a process known to those skilled in the art. The present invention advantageously provides a method for the fabrication of AAO substrates with pore diameters below 20 nm, and even below 10 nm. In one embodiment, the method entails the use of diluted electrolytes at temperature below about 0° C. to form reduced pore diameters. According to another embodiment, the present invention advantageously provides a method for the fabrication of AAO substrates with pore diameters greater than 200 nm. The method can include the use of additives that allow anodization voltages in excess of about 200V during anodization.

Table 1 illustrates representative ranges of anodization conditions that can be used to produce AAO substrates for support structures, and the resulting support parameters in accordance with the present invention.

Both potentiostatic and galvanostatic modes of anodization can be utilized to form the AAO support structure. Potentiostatic mode can ensure substantially uniform pore diameter through the thickness of the support, with anodization current density and AAO growth rate decreasing with time. On the other hand, galvanostatic mode maintains a constant growth rate, thus ensuring shorter process duration while allowing the voltage (and the pore diameter) to increase with time.

TABLE 1

| Electrolyte | Voltage or Current | Temp. (° C.) | Charge (C/cm$^2$) | Pore dia., nm/ Porosity, % | Thickness (μm) |
|---|---|---|---|---|---|
| 0.01-5% $H_2C_2O_4$ | 5-100 V 1-50 mA/cm$^2$ | −5/+25 | 2-1000 | 8-80/10-15 | 1-500 |
| 0.01-5% $H_2C_2O_4$ + additives** | 100-600 V | −5/+25 | 2-1000 | 100-600/10-30 (up to 1000 nm with additional pore etching) | 1-500 |
| 0.01-3M $H_2SO_4$ | 5-25 V | −5/+25 | 2-1000 | 10-20/7-18 | 1-500 |

TABLE 1-continued

| Electrolyte | Voltage or Current | Temp. (° C.) | Charge (C/cm²) | Pore dia., nm/ Porosity, % | Thickness (μm) |
|---|---|---|---|---|---|
| 0.01-3M H$_2$SO$_4$* | 5-25 V | −50/+25 | 2-1000 | 5-15/5-15 | 1-500 |
| 0.01-3M H$_3$PO$_3$ | 10-200 V | −5/+25 | 2-1000 | 30-200/7-20 | 1-500 |

*alcohols, ketones, glycols, or other solvents added to lower the freezing point.
**additives to increase anodization voltage include salts of certain metal cations (such as Al(III), Ti(III), V(V), Zr(IV), Nb(V), K(I) and others; anions of organic and inorganic acids (such as oxalate, citrate, borate, malate and others), as well as metal complexes with other ligands.

The practical limits of the size of the membrane support structure and the composite membranes is up to 10" in two of the planar membrane dimension. In one embodiment, circular planar membranes with overall diameter as large as 150 mm were produced.

After anodization, AAO films 102 are still attached to Al 140 as shown in FIG. 3 and FIG. 4, and have a dense aluminum oxide layer 142 separating the porous AAO from Al. In order to make a functional membrane, this barrier layer 142 has to be removed. This is done either prior to the deposition of the active layer as illustrated in FIG. 3, or after the deposition of the active layer as illustrated in FIG. 4, as is described herein.

If the separation of AAO support membrane is required prior to deposition of the active layer, this process is carried out after the anodization, and involves electrochemical polarization of the AAO on Al substrate using acidic electrolytes such as phosphoric acid or hydrochloric acid, or using basic electrolytes such as sodium hydroxide or potassium hydroxide. This process leads to localized dissolution or "breach" of the barrier layer due to the effect of anodic or cathodic bias and results in free-standing membranes with pores that open on both faces.

For operation above about 750° C., blank AAO substrates can be annealed at about 900° C. to 1200° C. prior to deposition of the active layer to convert amorphous alumina into a thermally stable polycrystalline gamma- or alpha-alumina phase.

To facilitate membrane integration, the present invention can include the fabrication of membranes supported by an aluminum rim as shown in FIG. 5. According to this embodiment, a portion of the AAO support remains attached to the Al by exposing only the central portion of the membrane 152 to the separation or "barrier layer breaching" step. In one example, the barrier layer at the AAO/Al interface in a central portion of the support can be breached without breaking off from the rest of the membrane. Selective back-etch of the Al substrate can then be performed to expose the central portion of the AAO 152, with the rest of the AAO remaining attached to an Al rim.

In another embodiment, a window 150 in the Al foil is etched prior to breaching of the barrier layer, which thickness is reduced by using an appropriate anodization voltage profile to create asymmetric membranes and to reduce the resistance of the barrier layer in order to facilitate creation of active layer by electrochemical deposition to be localized according to the present invention.

Figure 6:
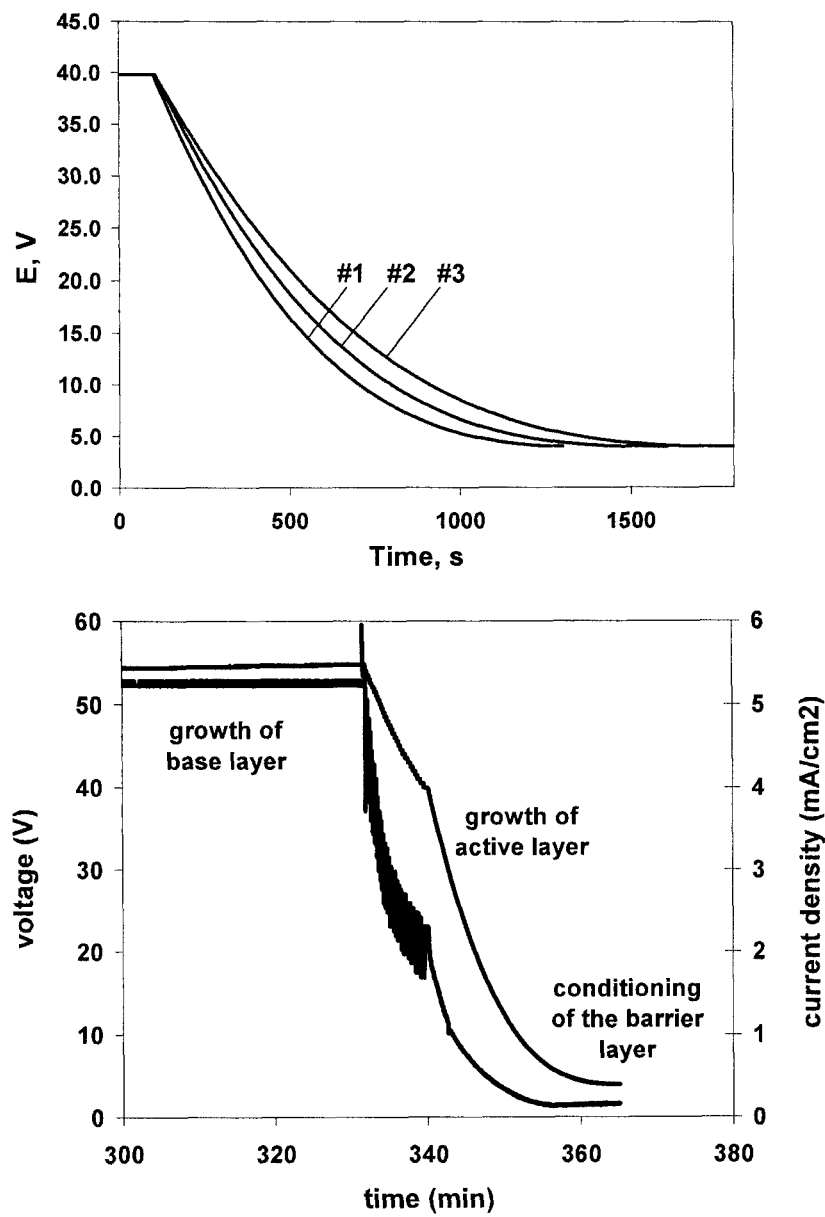
FIG. 6 illustrates anodization voltage reduction profiles, corresponding current density for a profile according to an embodiment of the present invention.

The procedure for fabrication of an asymmetric support structure for an asymmetric pore membrane involves a three-step anodization method described in FIG. 6. The steps can include: (1) growth of the "base layer" at a constant current or voltage to form the desired thickness and desired first (larger) pore diameter; (2) reduction of the anodization voltage using a smooth profile to form second (smaller) pore diameters, where the pore diameter is directly proportional to the anodization voltage; and (3) a current recovery step at constant voltage to condition the barrier layer to ensure that the subsequent electrodeposition of the active material (e.g., Pd) results in a uniform active layer. Steps 1 and 2 can be repeated to create multiple layers with different pore diameters and pore densities. According to the present invention, continuous anodization voltage profiles (Step 2 above) can be used to increase the rate of formation of the layer(s) with different pore diameter and density and to better control the morphology in such layer(s).

According to one embodiment of the present invention, the shape of the anodization voltage profile for forming reduced pore diameters and thinning the barrier layer (Step 2), and the current recovery profile to maximize the deposition uniformity (Step 3) is based on a 3rd degree polynomial used to calculate the voltage-time (E-t) profile:

$$E = at^3 + bt^2 + ct + d$$

The initial anodization voltage (E1) and final anodization voltage (E2) are used as boundary conditions and are selected from available ranges of anodization conditions shown in Table 1. Adjustable parameters included the initial $(dE/dt)_1$ and the final $(dE/dt)_2$ potential change rate, and the profile duration (t2−t1). The initial potential slope can be varied from about −50 V/s to about −0.005V/min, and preferably from about −1V/s to about 1V/min. The final potential rate change can be from about −50 V/s to about 0 V/s, preferably from about −10V/min to about 0. The duration of the voltage reduction step depends on the voltage change range and desired pore profile, and can vary from about 1 second to several hours.

In one example, 5% oxalic acid electrolyte is used for both the synthesis of the base layer (galvanostatic mode, 5 mA/cm², final anodization voltage (E1) of 40V, corresponding to a pore diameter of about 37 nm), as well as for the formation of the small pore size layer (voltage (E2) reduced to 4V, corresponding to a pore diameter of about 5 nm). The first voltage derivative and the process duration are varied, and the second derivative is set to 0.

Representative voltage reduction anodization profiles are illustrated in FIG. 6 (top), along with the schematic representation of the resulting pore structure. A preferred profile for anodization voltage reduction from 40 V to 4 V is found to be (dE/dt)1=−0.0070 V/s and t2=1500 s. The resulting anodization profile for the entire process (growth of the base layer, forming an active layer and conditioning the barrier layer) is illustrated in FIG. 6 (bottom). Scanning electron microscope (SEM) images of the resulting asymmetric membrane after electrochemical separation from Al (performed as described in U.S. Pat. No. 6,705,152 by Routkevitch et al.) show uniform pore diameter in the base layer and a smooth, homogeneous and defect-free surface of the active layer. Permeability data confirm that the pores are open.

Other profile shapes based on different algorithms can be implemented. It can be described by either a number of known mathematical functions, or a numerical approximation of an exteriemental voltage reduction profile.

In one embodiment, the pore diameter of the membranes can be increased by conformal dissolution of alumina from the pore walls in appropriate acidic or basic solutions, such as phosphoric acid, sodium hydroxide, potassium hydroxide, or other solutions that can dissolve alumina. Preferred embodiments include the use of 0.5M H$_3$PO$_4$ or 0.1M NaOH at temperatures in the range of 0° C. to 50° C. Preferred etching times depend upon the desired initial and final pore diameter and the temperature, and can vary from about 10 seconds to about 5 hours, preferably from about 5 min to about 180 min.

In one embodiment, the pore diameter of the support structure can be reduced by conformal deposition of materials onto the pore walls. Methods for deposition can include sol-gel, solution impregnation, electroless deposition, electrochemical deposition, chemical vapor deposition, atomic layer deposition and others. One preferred embodiment involves atomic layer deposition of oxides, such as alumina, silica, zinc oxide, and other materials.

Active Layer Formation

In one embodiment of the present invention, for the fabrication of $H_2$ separation composite membranes, Pd or Pd alloys are used to form the active layer, with Cu being used as a sacrificial layer. Both Pd and Cu can be deposited inside the pores of an AAO support using either commercially available or custom made electrolytes, forming an active layer having dense nanoplugs disposed within the pores of the support. Both conventional "DC" electrodeposition methods (potentiostatic and galvanostatic) as well as "pulse" and "AC" techniques can be used.

For the fabrication of symmetric membranes with the active layer within the pores and not on the membrane surface, the electrical contact to the pores can be provided by a dense film of conductive material, such as a metal, deposited onto one face of the support. In one embodiment, the conductive film is a Cu film, such as one having a thickness of at least about 100 nm and not greater than about 2000 nm. Such a film can be deposited onto a face of the membrane by DC plasma sputtering, for example. Galvanostatic deposition (DC mode, current density inside the pores of from about −1 to about −5 mA/cm$^2$) is a preferred method for fabricating symmetric support structures with a Cu contact to form sacrificial and active layers.

For the fabrication of asymmetric membranes, the contact can be provided by the Al substrate. In this case, the deposition is hindered by the presence of a dense oxide layer at the interface between the support and the Al foil. This insulating layer prevents the use of conventional electrodeposition methods. The preferred methods in this case are pulse, reverse pulse, and AC potential waveform with a DC offset.

The main electrodeposition parameters that define the length and the uniformity of the nanoplugs in the active layer are the electrolyte composition, the temperature, the deposition mode, the waveform, the potential, the current density and the time. These parameters are selected based on the type of AAO support structure and desired active layer morphology. Other factors affecting the uniformity and the rate of the deposition of the active layer include the shape and duration of the voltage reduction profile during the step of the conditioning of the barrier layer for asymmetric membranes with Al as a contact. A proper combination of these parameters can lead to the electrodeposition of fully dense and conformal nanoplugs inside the pores of the AAO support structure of both types, symmetric and asymmetric.

Figure 7:
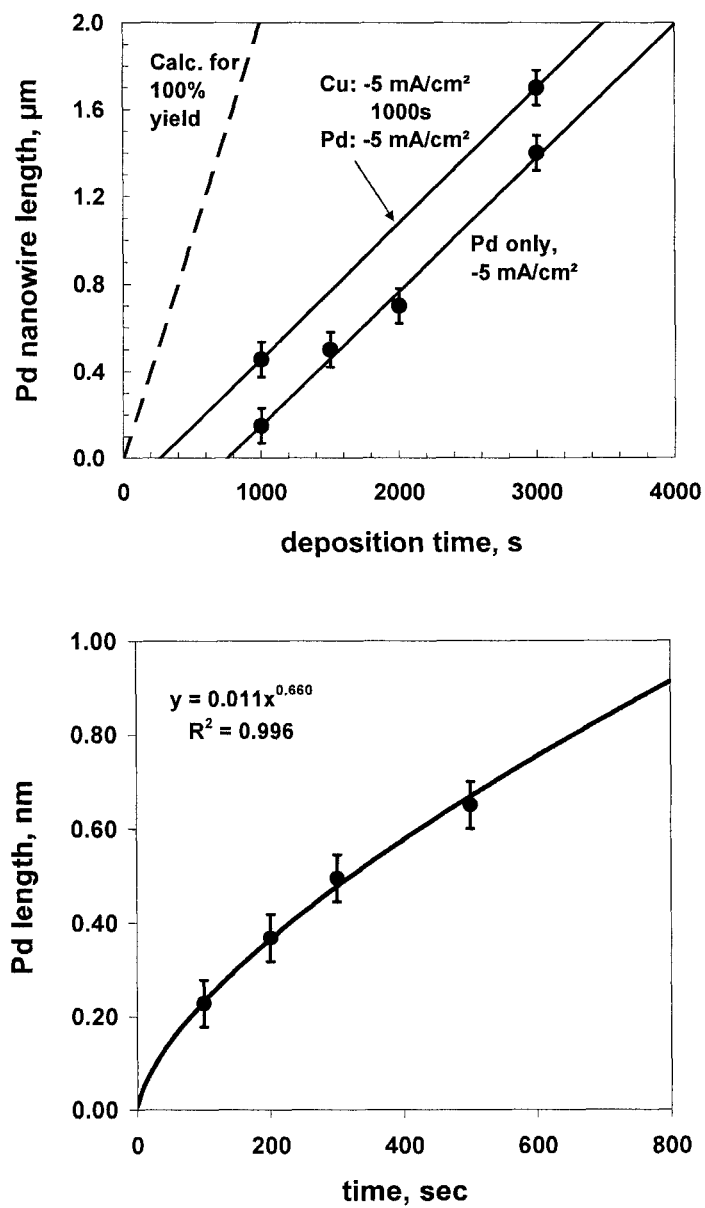
FIG. 7 illustrates the thickness of a Pd layer as a function of deposition time for symmetric and asymmetric membranes according to an embodiment of the present invention.

One embodiment of the present invention utilizes a 20 Hz to 100 Hz sine potential waveform having amplitude from ±1V to ±15V, which can depend upon E2. In one embodiment, E2=4V, and the preferred amplitude is ±9V. The DC offset can be from 0 to ±10V, and in one example for E2=4 V, the preferred DC offset is −1V. The duration of deposition can be from 1 second to several hours, with the length of nanoplugs (thickness of the active layer) generally increasing with the deposition time, as shown in FIG. 7. The preferred duration of deposition of the Cu sacrificial layer is from about 100 s to about 5000 s, forming Cu nanoplugs having a length of from 0.2 μm to 10 μm. A preferred duration of Pd active layer deposition is from about 200 s to about 4,000 s, resulting in Pd nanoplugs having a length from about 100 nm to about 1 μm, which is significantly thinner than the Pd film thickness utilized in conventional supported membranes.

Accordingly, electrodeposition can be used to place sacrificial Cu nanoplugs at the bottom of the AAO pores, which can be used to localize Pd nanoplugs at a desired distance from the membrane surface (FIG. 3, FIG. 4, top chart in FIG. 7).

The sacrificial Cu layer can be removed from the support using known liquid or gas phase methods for Cu metal etching. For example, an ammonium persulfate (APS) etch, or a solution of sulfuric acid and hydrogen peroxide (Piranha etch) can be utilized to remove the Cu sacrificial layer. Thus, control of the location of the active layer, such as Pd, within the membrane support can be achieved by using sacrificial nanoplugs, such as Cu, of varying length.

The present invention includes several methods to form an active layer from Pd-alloys. One preferred method is electrochemical co-deposition of Pd and another metal, such as Cu or Ag, from mixed electrolytes containing ionic species of both Pd and the other metal. The alloy composition is determined by the partial current densities, which depend on deposition potential and the electrolyte composition.

According to another embodiment of the present invention, a method is provided that includes annealing of a porous support containing two or more metals, such as Pd and Cu, that have been consecutively deposited to form an alloy phase between the metals. The alloy composition of the annealed active layer can be controlled by varying the length of the metal nanoplugs, along with varying the annealing temperature and the anneal duration. This approach provides a convenient route for fabricating composite membrane from alloys such as Pd—Cu and Pd—Ag alloys, and is also useful for the fabrication of other alloys. The annealing temperature can be at least about 200° C. and is preferably not greater than about 1600° C., such as from about 500° C. to about 1000° C. The annealing atmosphere can be varied and can include reducing or oxidizing atmospheres, as well as otherwise inert or reactive atmospheres. Proper selection of the annealing atmosphere can be used to improve the performance of the active layer due to changes in the chemical composition and the crystalline structure of the active layer. The deposition method for the consecutive metal layers can include sol-gel, solution impregnation, chemical vapor deposition, atomic layer deposition and other methods.

According to another embodiment of the present invention, consecutive deposition of different materials and/or different methods as described above can be used to form multiple active layers, or to implement layers having multiple functionality, as shown in FIG. 2. In one preferred embodiment for $H_2$ separation, the multilayer structure includes a poison-resistant layer, such as Ta for resistance to sulfur, on top of a $H_2$-separating layer based on Pd or Pd alloys. Another preferred embodiment includes a conformal coating of an appropriate catalyst such as Cu/ZnO to form catalytic nanotubes adapted to catalyze a steam reformation or water gas shift reaction. Dense nanoplugs of Pd or Pd alloys or other materials described herein, serving a catalytic function or a $H_2$ separation function, can form a nanochannel array membrane-reactor for converting alcohols or hydrocarbons into $H_2$. Such catalytic coatings as Cu/ZnO can be deposited by sol-gel or atomic/chemical vapor deposition.

In yet another embodiment, the dense barrier layer of AAO can be used as one of the components, or the only component, of the active layer. In yet another embodiment, the entire anodic alumina membrane or just the barrier layer can be chemically converted into a different material to form membrane of desired composition.

Fabricating a Membrane Having a Metal Rim

According to one embodiment, the present invention also provides a method for the fabrication of an AAO support structure having an Al rim. Such a structure is advantageous, as it enables a device fabricated from the AAO support, such as a composite membrane, to be sealed into an apparatus incorporating the device.

After forming an optional sacrificial layer 144, and an active layer 110 inside the pores of an AAO support structure, three additional processing steps (FIG. 5) can be carried out to fabricate the structure with an Al rim 112:

1) Etching of Al substrate 140 to open a window 150 in Al;
2) Etching of the barrier layer to provide access to the active layer; and
3) Etching of the sacrificial layer 144, if a sacrificial layer is used.

In one embodiment, the first two steps are performed before forming the active layer in AAO membrane.

For the Al etching step, the back side of an Al foil with an attached AAO substrate is masked with a chemically resistive protective pattern, such as by using a photoresist, lacquer or tape, or is patterned with a chemically inert gasket or O-ring, to expose an Al area 150 of the desired size. A wet chemical etch that does not react with the AAO, such as a solution of hydrochloric acid (HCl) and copper chloride ($CuCl_2$), is used to dissolve the Al and expose the AAO support structure. The etching of Al effectively stops when the AAO surface is reached.

To etch the barrier layer 152, if the blank AAO support membrane is formed without breaching of the dense barrier layer, the barrier layer has to be removed. This process is critical for maximizing membrane permeability, while avoiding overetching of the membrane and maintaining zero defect density. Etching can take place using appropriate acidic or basic solutions that can dissolve alumina, such as phosphoric acid, sodium hydroxide or potassium hydroxide. In a preferred embodiments, the alumina barrier layer is etched with 0.5M $H_3PO_4$ or 0.1M NaOH at a temperature in the range of from about 0° C. to about 50° C. The preferred etching time depends on the barrier layer thickness and etching temperature, and varies from about 10 s to about 2 hrs. Etching of the barrier layer can also be performed in a gas phase using, for example, a plasma ion etch.

Etching of the sacrificial layer 144 can be performed using common wet or gas phase methods known to those skilled in the art, depending on the materials used as a sacrificial layer. In one preferred embodiment, solution of ammonium persulfate or Piranha etch is used for etching a copper sacrificial layer.

EXAMPLES

Having described the invention, the following examples are given to further illustrate the invention. These specific examples are not intended to limit the scope of the invention described in this application.

Example 1

Blank Symmetric and Asymmetric Membranes

Blank AAO symmetric and asymmetric support membranes are formed by anodizing 99.99% pure Al foil that is rolled and pressure-annealed at 350° C. and 5,000 psi for 20 min. The resulting Al foil is cleaned and anodized on both sides in 1% oxalic acid electrolyte at a temperature of 10° C. and an anodization current density of 10 $mA/cm^2$, until a charge density of 20 $C/cm^2$ is accumulated. The resulting layer of aluminum oxide is then stripped in a hot solution of 200 g/l chromic oxide in 50% phosphoric acid, the Al substrate is rinsed and dried, and an adhesion layer of 0.5 μm of AAO is grown using the same conditions.

Conventional photoresist is applied to both sides of the Al substrate, is soft-baked at 90° C. for 20 min and is exposed to a UV light using a mask with the openings of required size and format to define the number, the location, the size and the format of the membranes—in this case, four 25 mm circular membranes on each side of a 70 mm×70 mm substrate. Final anodization is carried out in 1% oxalic acid electrolyte at temperature of 10° C. and anodization voltage of 80V until charge density of 100 $C/cm^2$ is accumulated, corresponding to a 50 μm thick symmetric AAO support structure with a pore diameter of about 65 nm and a porosity of about 12%.

Voltage reduction profile #2 (described above) is applied to some of the Al substrates to fabricate asymmetric support structures with a thinner barrier layer and smaller final pore size. The anodization voltage is reduced to 20V and the anodization is continued for another 100 seconds, resulting in a final pore diameter of about 18 nm. Some of these Al substrates are rinsed and transferred into a 1M solution of sulfuric acid, where anodization is re-started at 20V, and a different voltage reduction profile is applied to bring the anodization voltage to 2V, resulting in a final pore diameter of less than 5 nm and a porosity of about 15%.

To form free-standing membranes without an Al rim, both types of AAO membranes are separated in a solution of concentrated perchloric acid and acetic anhydride at a cathodic bias of 5 V to 10 V above the final value of anodization voltage. The pore diameter in some of the symmetric membranes was increased by slow chemical dissolution of the alumina from the pore walls for 20 min in the solution of 0.5M phosphoric acid, resulting in the final pore diameter of about 80 nm. The resulting membranes are rinsed, dried, annealed to 1100° C. to form alpha-alumina, and are then ready for the deposition of active layers. Blank support membranes with overall diameter as large as 150 mm were produced in this example.

Example 2

Blank Symmetric and Asymmetric Membranes with an Al Rim

Blank AAO symmetric and asymmetric membranes are produced using Al foil prepared and patterned as noted in Example 1, except only one size of Al substrate is patterned with 13 mm membranes. Anodization is carried out in 3% oxalic acid electrolyte at a temperature of 12° C. and an anodization voltage of 40V until a charge density of 200 $C/cm^2$ is accumulated, resulting in 100 μm thick AAO films with 37 nm pores. With some Al substrates, voltage reduction profile #2 (described above) is used to bring the anodization voltage down to 4 V, and anodization is continued for 100 seconds at 4V. The resulting asymmetric AAO has a final pore diameter of about 5 nm.

The resulting AAO supports, which are still attached to Al, are masked with 3M electroplating tape to define 8 mm circles in the center of the 13 mm membranes. The barrier layer in the exposed area was breached in a solution of concentrated hydrochloric acid at −2° C. by slow ramping of the cathodic potential until 3V to 10V above the final value of the anodization voltage is reached. As a result, the barrier layer is breached only in the defined 8 mm area, and the rest of the AAO support remains firmly attached to Al. A backside of the Al foil opposite the 13 mm AAO is then also masked to define a 10 mm circles opposite to the area where the barrier layer is breached, and exposed Al is etched using a solution of 20% hydrochloric acid and 15% $CuCl_2$ in water, until the back side of the AAO support was exposed, forming both symmetric and asymmetric membranes with through porosity and supported by an Al rim. A similar procedure can be applied to form tubular AAO membranes.

Example 3

Composite AAO/Pd Membranes with Al Rim for $H_2$ Separation

Blank AAO membranes on Al foil are produced as previously noted in Example 2, except the process is stopped before masking for breaching of the barrier layer. Electrodeposition of a Cu sacrificial layer is carried out in an aqueous solution of 0.5M $CuSO_4$ for 1000 seconds in potentiostatic mode using a 100 Hz sinusoidal waveform with an amplitude of ±9V and a DC offset of −0.5V. Electrodeposition of the active layer of Pd nanoplugs is carried out in a commercial PallaSpeed electrolyte (Technic) for 500 seconds in potentiostatic mode using a 100 Hz SINE waveform with an amplitude of ±9V and a DC offset of −0.5V. A backside of the Al foil opposite to the AAO support is masked to define an 8 mm circle and exposed Al is etched using a solution of 20% hydrochloric acid and 15% $CuCl_2$ in water, until the backside of AAO/Pd/Cu membrane is exposed. The barrier layer is etched for 20 to 30 minutes in a solution of 0.5M of phosphoric acid, followed by the selective etch of Cu in the APS etchant for 2 minutes. This resulted in a 0.6 µm thick active layer of Pd nanoplugs located within the pores approximately 5 µm from the membrane surface. Longer Cu deposition time can lead to the active layer being located deeper within the support structure. Increasing the Pd deposition time can result in a thicker active layer. The Al substrate is trimmed to 25 mm diameter.

Testing of both the blank AAO support and the composite AAO/Pd membranes demonstrate that, when properly supported, the membranes withstand pressures up to 100 psi, and possibly higher, as 100 psi is the upper limit of the test system. Further, temperatures up to 650° C. (for membranes with an Al rim) and 850° C. (for membranes without Al rim) can be withstood.

Figure 8:
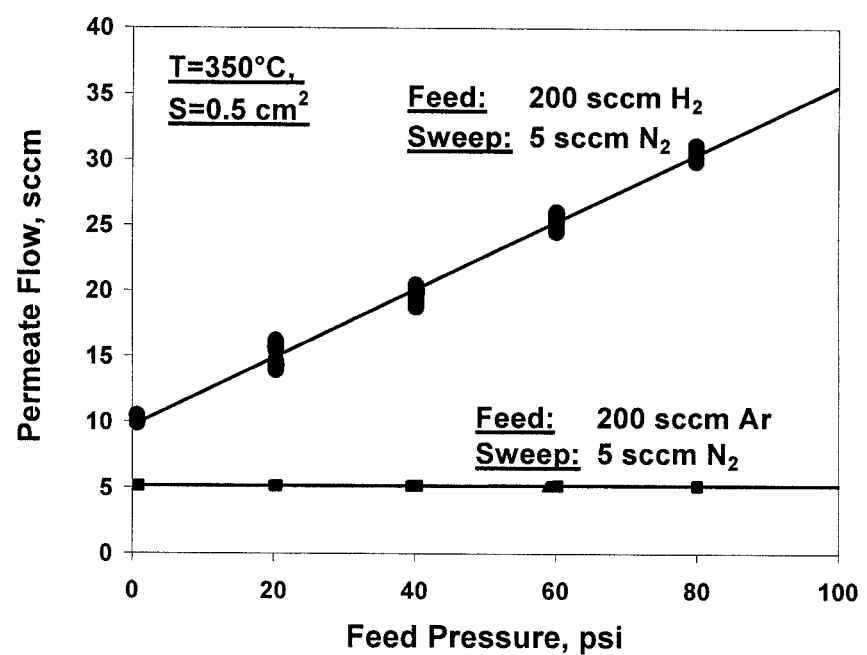
FIG. 8 illustrates the flux of $H_2$ and Ar through a composite membrane (membrane area 0.5 cm$^2$) according to an embodiment of the present invention.
Figure 9:
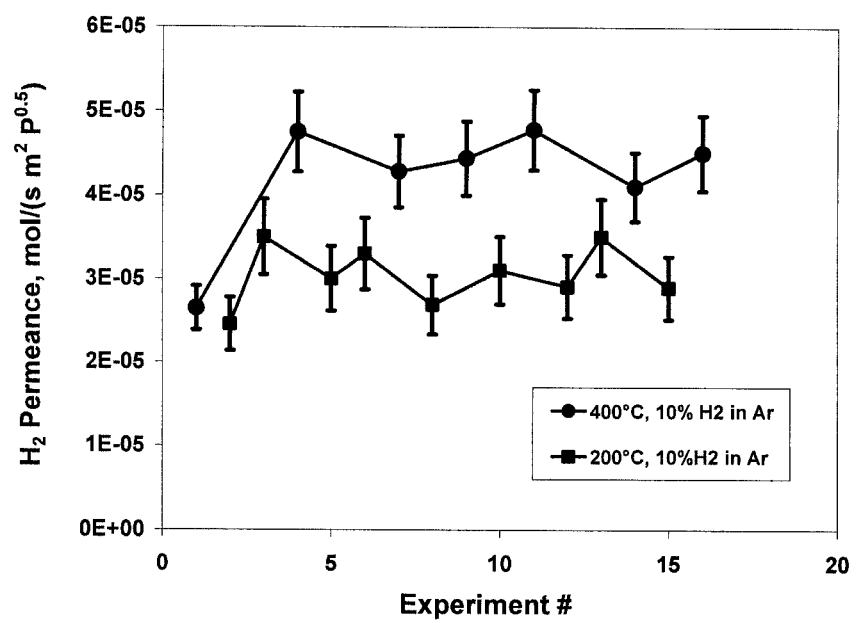
FIG. 9 illustrates the temperature cycling stability of a composite membrane according to an embodiment of the present invention.

The composite AAO/Pd membranes demonstrate $H_2$ permeance of up to 0.8 $mmol/s/m^2/Pa^{0.5}$ at 250° C. to 350° C. (FIG. 8), and permselectivity (i.e., the ratio of permeability of hydrogen to argon) up to 1000. Comparison of blank and composite membrane permeability show that AAO will not limit the composite membrane performance for the targeted length of Pd nanoplugs. Composite AAO/Pd membranes also demonstrate excellent resistance to repeated thermal cycling from 200° C. to 400° C. in the presence of $H_2$, with no noticeable impact on permeability, permselectivity and membrane integrity (FIG. 9). No negative effects of $H_2$ embrittlement and no leaks are detected as a result of temperature cycling. SEM photomicrographs do not reveal any changes in nanoplug morphology, which remains conformal to the pore walls.

Example 4

Composite AAO/(ZnO—Cu)/Pd Membrane-Reactor for Methanol Reforming

Composite AAO/Pd membranes on Al foils are fabricated as previously noted in Example 3. A thin layer of a steam reforming catalyst (ZnO doped with Cu) is applied to the pore walls by dip-coating in a 0.5M solution of copper and zinc acetates in isopropanol, followed by blotting of excess solution, drying at 100° C. for 5 min and burn-out for 10 min at 350° C. Following 5 to 20 catalyst coatings, membranes are annealed up to 750° C. for 1 hr to stabilize the composition and the crystal structure of the catalyst, and reduced at up to 500° C. for 1 hr in 5% $H_2$ in Ar to form nanostructured Cu catalyst particles. These nanochannel membrane-reactors are tested for $H_2$ generation by steam reforming of methanol and demonstrated space velocity superior to bulk catalysts.

While various embodiments of the present invention have been described in detail, it is apparent that modifications and adaptations of those embodiments will occur to those skilled in the art. However, it is to be expressly understood that such modifications and adaptations are within the spirit and scope of the present invention.

What is claimed is:

1. A planar composite membrane, comprising:
a planar porous support structure comprising anodic aluminum oxide and having a first major surface and a mutually opposed second major surface, the porous support structure comprising substantially parallel elongate pore channels extending through the support structure from the first major surface to the second major surface;
an active layer comprising an active layer material, the active layer being disposed within the elongate pore channels between the first major surface and the second major surface; and
an aluminum rim integrally formed with an outer peripheral edge of said porous support structure, wherein the aluminum rim is directly bonded to the porous support structure without the use of an intermediate bonding material.

2. The composite membrane recited in claim 1, wherein said active layer is completely disposed within the elongate pore channels.

3. The composite membrane recited in claim 2, wherein said active layer is spaced inwardly from each of said first and second major surfaces.

4. The composite membrane recited in claim 3, wherein said active layer is spaced inwardly from each of said first and second major surfaces by at least about 1 nm.

5. The composite membrane recited in claim 1, wherein said porous support structure has an average thickness of at least about 0.1 µm and not greater than about 500 µm.

6. The composite membrane recited in claim 1, wherein said active layer has a thickness of not greater than about 5 µm.

7. The composite membrane recited in claim 1, wherein said active layer comprises Pd.

8. The composite membrane recited in claim 2, wherein said active layer comprises Pd alloyed with at least one element selected from Cu and Ag.

9. The composite membrane recited in claim 1, wherein said active layer comprises an amorphous metal alloy.

10. The composite membrane recited in claim 1, wherein said active layer comprises a first active layer material and a second active layer material that is different than said first active layer material.

11. The composite membrane recited in claim 10, wherein said first active layer material is adapted to separate a gas species.

12. The composite membrane recited in claim 11, wherein said second active layer material is a catalytic material.

13. The composite membrane recited in claim 1, wherein the porous support structure and the aluminum rim are integrally formed by the anodization of a single sheet of aluminum foil.

* * * * *